Oct. 4, 1949.    H. C. EDWARDS    2,483,695
PROCESS OF ASSEMBLING A SELF-CONTAINED ROLLER
BEARING CAGE, ROLLER, AND RACEWAY UNIT
Filed Nov. 16, 1946    2 Sheets-Sheet 1

INVENTOR:
Herbert C. Edwards
by Carr & Carr & Gravely
HIS ATTORNEYS.

Oct. 4, 1949.   H. C. EDWARDS   2,483,695
PROCESS OF ASSEMBLING A SELF-CONTAINED ROLLER
BEARING CAGE, ROLLER, AND RACEWAY UNIT
Filed Nov. 16, 1946   2 Sheets-Sheet 2

INVENTOR:
Herbert C. Edwards
by Carr & Carr & Gravely
HIS ATTORNEYS.

Patented Oct. 4, 1949

2,483,695

UNITED STATES PATENT OFFICE 2,483,695

PROCESS OF ASSEMBLING A SELF-CONTAINED ROLLER BEARING CAGE, ROLLER, AND RACEWAY UNIT

Herbert C. Edwards, Canal Fulton, Ohio, assignor to The Timken Roller Bearing Company, Canton, Ohio, a corporation of Ohio Application November 16, 1946, Serial No. 710,261

3 Claims. (Cl. 29—148.4)

1

This invention relates to self-contained roller bearing cage, roller and raceway units of the kind having a cage comprising axially spaced end rings connected by roller spacing bridges that project integrally from one end ring and have reduced ends secured in openings extending through the other end ring. The invention has for its principal object a simple and economical process of quickly and easily assembling a roller bearing unit of the above type without distorting or changing the spacing or angularity of the bridges and which will provide strong, accurate and durable connections between the bridges and the separate end ring. The invention consists in the roller bearing assembling process hereinafter described and claimed.

Figure 1:
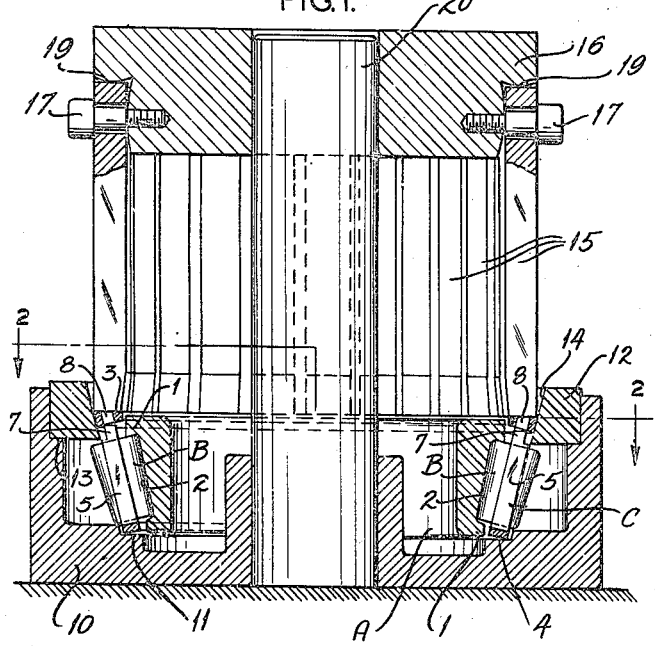
Figure 3:
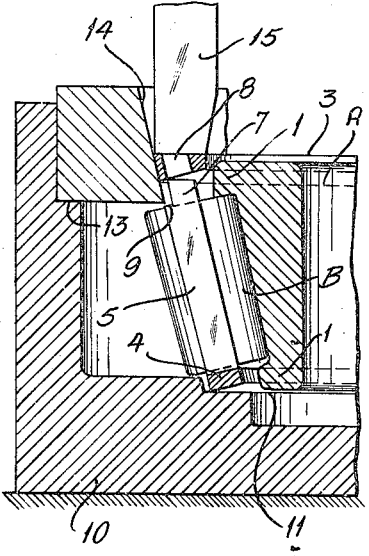
Figure 2:
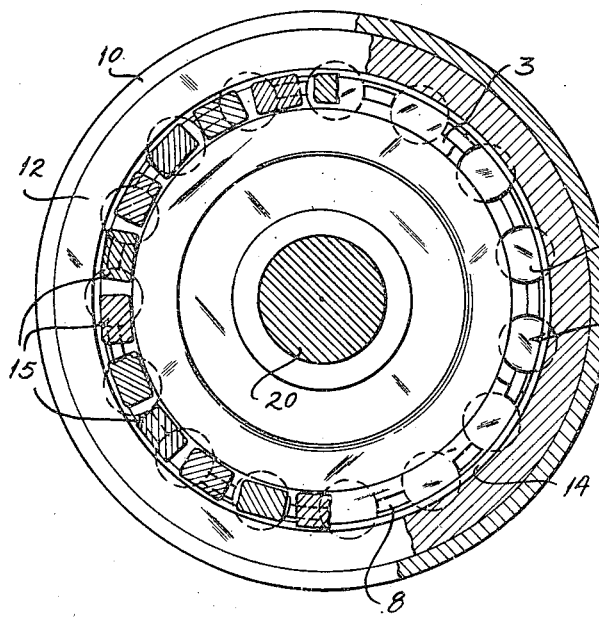
Figure 4:
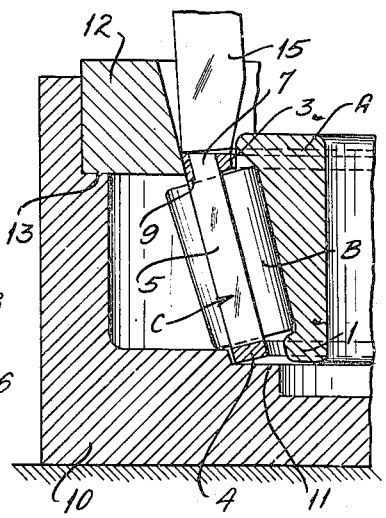
Figure 5:
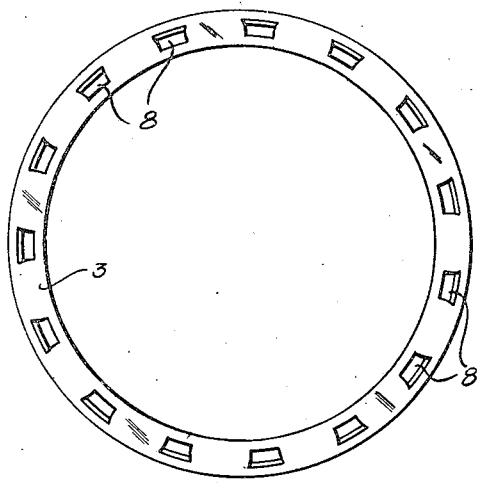
Figure 7:
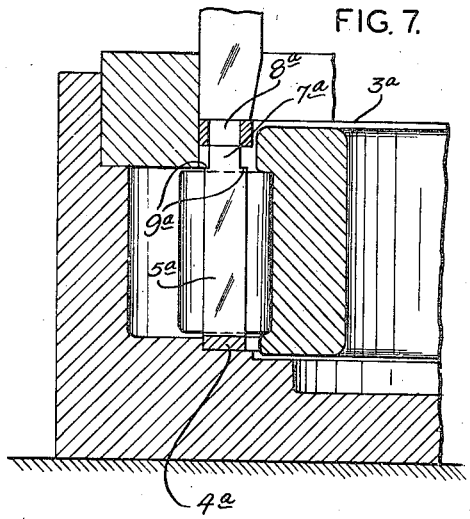
Figure 6:
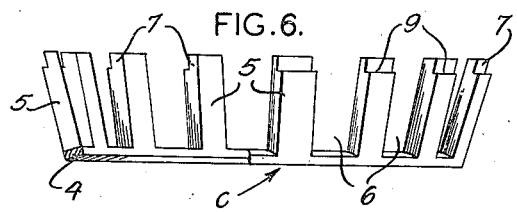
Figure 8:
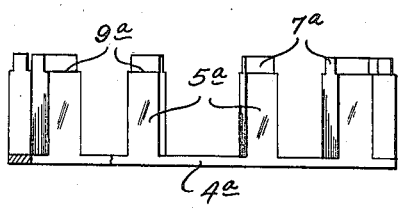
Figure 9:
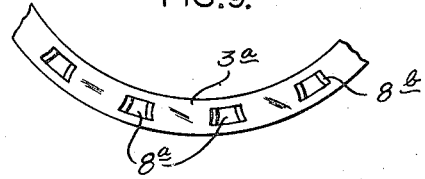
Figure 10:
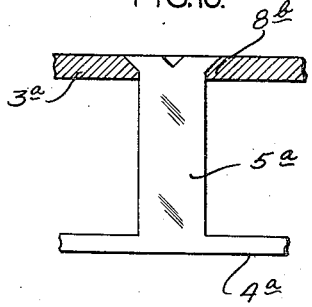

In the accompanying drawings, which form part of this specification and wherein like symbols refer to like parts wherever they occur, Fig. 1 is a central vertical sectional view, showing the bearing mounted in the assembling feature with the separate end ring of the cage in position for connection with the free ends of the bridges thereof, Fig. 2 is a horizontal sectional view on the line 2—2 in Fig. 1, Fig. 3 is an enlarged fragmentary sectional view similar to Fig. 1, Fig. 4 is a sectional view similar to Fig. 3, showing the separate end ring connected to the bridges of the cage, Fig. 5 is a plan view of the separate end ring of the cage, Fig. 6 is a part side elevational and part longitudinal sectional view of the integral end ring and bridge member of the cage, Fig. 7 is a view similar to Fig. 3, showing the manner of securing the separate end ring to the bridge members of a cylindrical roller bearing cage, Fig. 8 is a part side elevational and part sectional view of the integral end ring and bridge unit of the cylindrical cage shown in Fig. 7, Fig. 9 is a fragmentary plan view of the separate ring for said cylindrical cage; and Fig. 10 is an enlarged fragmentary view of the cylindrical cage, showing the manner in which the ends of the bridges are staked in the separate end ring.

In the accompanying drawings, my invention is shown embodied in a self-contained tapered roller bearing unit comprising a cone or inner raceway member A with ribs 1 at the ends of its conical raceway 2, a conically disposed series of conical rollers B cooperating with said raceway, and a conical spacing and retaining cage C for said rollers. The cage C comprises a separate large end ring 3, a small end ring 4 and conically disposed bridges 5 that connect said end rings and define therewith spacing and retaining pockets 6 for the rollers B. The bridges 5 are formed integral with the small end ring 4 and have radially reduced, full width, non-circular end portions 7 that are secured in correspondingly shaped conically disposed openings 8 that extend through the separate large end ring 3 at an angle corresponding to the angularity of said bridges. The pockets 6 taper in width from the large end ring to the small end ring in conformity with the taper of the rollers B; and the bridges have their longitudinal side edges concavely curved between their inner and outer peripheral surfaces in conformity with the curvature of the rollers and have portions disposed outwardly beyond the cone defined by the axes of said rollers so as to prevent the rollers from moving radially outward. The small end ring 4 is of rectangular cross-section and is dished inwardly, at right angles to the axes of the rollers B, while the large end ring 3 is of substantially V-shaped cross-section which tapers inwardly toward the axis of the cage with its inner end face disposed at the same angle as the small end ring and with its outer end face disposed normal to the cage axis. The large end ring 3 also has a conical outer peripheral surface which forms a continuation of the conical outer peripheral surfaces of the bridges 5.

As shown in the drawings, the bridges 5 of the cage C are of substantially the same cross-sectional shape and width throughout their entire length. However, the radially reduced large ring engaging end portions 7 of said bridges are formed preferably by reducing the outside diameter of said bridges to form shoulders 9 on the outer sides only thereof. The openings 8 in the separate large end ring 3 of the cage C are shaped to conform to the cross-sectional shape of the reduced non-circular end portions 7 of the bridges 5; and said end portions of said bridges are press-fitted in said openings with their shoulders 9 in abutting relation to the inner end of said large end ring.

The diameter of the small end ring 4 and the angularity and circumferential spacing of the bridges 5 integral therewith are the same as in the finished cage. The angularity of the bridge receiving openings 8 in the separate large end ring 3 are also the same as in the finished case. However, the large end ring 3 as initially made has a diameter that is slightly larger than the diameter of the ring after its application to the bridges 5; and said large end ring is also initially made with its conically disposed bridge receiving openings 8 located in a circle of larger diameter than the corresponding circle of said openings in the applied ring so that said openings are in proper position to receive the ends of the bridges when the ring is applied thereto.

In assembling the cage, roller and raceway unit, the inner raceway member A, rollers B and the small end ring 4 with its integral bridges 5 are placed in assembling relation in a cylindrical cup like holder 10 with the small end ring 4 seated on an internal annular ledge or shoulder 11 in the lower portion of said holder and with the upwardly and outwardly diverging bridges spaced inwardly of the side walls of said holder and disposed at the same angle as in the finished cage.

A guide ring 12 is then mounted in the holder 10 on an internal annular seat 13 provided therefor at about the level of the external shoulders 9 of the bridges 5 and has a downwardly tapering conical axial bore 14 which forms a continuation of the conical outer peripheral surfaces of the thick main body portions of said bridges and is thus spaced outwardly of the reduced upper end portions 7 thereof. An oversize large end ring 4 is then placed in the conical bore 14 of the guide ring 12 with the conical outer peripheral surface of said end ring fitting the conical surface of said bore and with the openings 8 in said ring in endwise alinement with the end portions 7 of said bridges. The oversize large end ring 3 is then forced downwardly in the conical bore 14 of the ring 12 and is gradually and uniformly reduced in diameter by said bore until the end portions 6 of the bridges 5 are fully entered in the openings 8 in said ring and the latter seats on the external peripheral shoulders 9 of said bridges.

The mechanism for forcing the large end ring 3 into engagement with the reduced end portions 7 of the bridges 5 preferably comprises a circular series of pendulum like pushers 15 that depend from the reduced lower end portion of a cylindrical pressure block 16 located above and in axial alinement with the holder 10. The pushers 15 have their upper ends loosely pivoted by means of horizontal cap screws 17 to the spherical outer peripheral surface 18 on the reduced lower end of the pressure block 16; and said upper ends of said pushers are disposed in abutting relation to an annular shoulder 19 formed on said pressure block by the reduced lower end thereof. The pressure block 16 is slidable on the upper end of a post 20 that is fixed at its lower end to the holder 10 centrally thereof. By this arrangement, the lower ends of the pusher 15 seat on the large end ring 3 in the conical bore 14 of the guide ring 12 seated in the holder 10. Thus, when the pressure block 16 is forced downwardly along the post 20, downward pressure is exerted on the upper ends of the pushers 15 by the annular shoulder 19 on said pressure block and the lower ends of said pushers force the oversize large end ring 3 down through the tapering bore 14 of the guide ring 12 into engagement with the reduced upper end portions 7 of the bridges 5. During this downward movement of the pressure block 16, the pushers 15 carried thereby are free to swing radially inwardly in the tapered bore 14 of the guide ring due to the loose cap screw connections between said pushers and said block and the spherical surface 18 of the latter.

In the hereinbefore described construction, the portions of the bridges that fit within the openings in the separate large end ring have substantially the same width as the main pocket forming portions thereof, thus increasing the strength and durability of the connections between the bridges and said end ring. These end portions, together with the openings provided therefor in the large end ring, are of non-circular section and thus prevent twisting of the bridges in said openings. The reduced radial thickness of the bridges provide shoulders which maintain the desired endwise spacing of the two rings; and the reduction in diameter of the large end ring during its application to the bridges serves to securely hold said ring thereon. With the above described assembling process, there is no tendency for the bridges to distort when the large end ring is applied thereto. Thus, no means need be provided for supporting the bridges laterally in the holder. The loose connections between the pushers and the pressure block enables the pushers to swing inwardly and readily accommodate themselves to the downward taper of the conical bore of the guiding and reducing ring for the large end ring of the cage.

In Figs. 7, 8, 9 and 10 of the accompanying drawings, is illustrated a cage for a cylindrical roller bearing. In this construction, the roller spacing bridges 5a project inwardly from one end ring 4a and are of substantially uniform width throughout their length. The radially reduced end portions 7a of the bridges 5a are formed by reducing the inside and outside diameters thereof to form internal and external stop shoulders 9a on said bridges. The openings 8a in the separate end ring 3a are shaped to snugly receive the end portions 7a of the bridges 5a and are preferably flared or chamfered, as at 8b, at the outer end of said end ring. The separate end ring 3a is applied without reducing the diameter thereof; and the end portions 7a of the bridges 5a are secured in the openings 8a in said end ring by staking the ends of said bridges to cause the metal thereof to flow into the chamfered portions 8b of said openings.

Obviously, the hereinbefore described construction admits of considerable modification without departing from the invention. Therefore, I do not wish to be limited to the precise construction shown.

What I claim is:

1. The process of assembling a conical roller bearing cage comprising large and small end rings connected by a circular series of conically disposed bridges integral at their converging ends with said small ring and extending at their conically disposed diverging ends through a circular series of conically disposed openings extending through said large ring which consists in initially making said large ring of diameter larger than that of the finished cage and with the converging ends of said conically disposed openings disposed in a circle of larger diameter than the circle of the diverging ends of said bridges, positioning said initially formed large ring with its openings in register with said diverging ends of said bridges, and then forcing said initially formed ring axially of said small ring to cause the diverging ends of said bridges to enter said openings while reducing the diameter of said large ring to that required for the finished cage without changing the spacing or angularity of said conically disposed bridges.

2. The process of assembling a conical roller bearing cage comprising large and small end rings connected by a circular series of conically disposed bridges integral at their converging ends with said small end ring and extending at their conically disposed diverging ends through a circular series of completely enclosed conically disposed openings extending through said large ring which consists in making said openings of non-circular shape and said diverging ends of said bridges of corresponding cross-sectional size and shape, initially making said large ring of diameter larger than that of the finished cage and with the converging ends of said conically disposed openings disposed in a circle of larger diameter than the circle of the diverging ends of said bridges, positioning said initially formed end ring with its openings in register with said diverging ends of said bridges and then forcing said initially formed ring axially of said cage to cause said diverging ends of said bridges to enter said openings while reducing the diameter of said large ring to that required for the finished cage without changing the spacing or angularity of said conically disposed bridges.

3. The process of assembling a conical roller bearing cage comprising large and small end rings connected by a circular series of conically disposed bridges integral at their converging ends with said small end ring and extending at their diverging ends through a circular series of completely enclosed conically disposed openings extending entirely through said large ring which consists in making said openings of non-circular shape and said diverging ends of said bridges of correspondingly cross-sectional size and shape, reducing the radial thickness only of said end portions of said bridges to provide shoulders adapted to abut against the inner face of said large ring, initially making said large ring of diameter larger than that of the finished cage and with the converging ends of said conically disposed openings disposed in a circle of larger diameter than the circle of the diverging ends of said bridges, positioning said initially formed end ring with its openings in register with said diverging ends of said bridges, and then forcing said initially formed ring axially of said cage to cause said diverging ends of said bridges to enter said openings while reducing the diameter of said large ring to that required for the finished cage without changing the spacing or angularity of said conically disposed bridges.

HERBERT C. EDWARDS.

REFERENCES CITED

The following references are of record in the file of this patent:

UNITED STATES PATENTS

| Number | Name | Date |
|---|---|---|
| 1,080,169 | Reed | Dec. 2, 1913 |
| 1,781,241 | Ness et al. | Nov. 11, 1930 |
| 1,783,957 | Darby | Dec. 9, 1930 |
| 2,000,276 | De Laval-Crow | May 7, 1935 |
| 2,017,772 | Schildgren et al. | Oct. 15, 1935 |
| 2,330,741 | Potter | Sept. 28, 1943 |